Nov. 16, 1965  D. S. GREY  3,218,114

CINEMATOGRAPHIC METHOD AND APPARATUS

Filed May 19, 1961

INVENTOR
David S. Grey

BY
Brown and Mikulka
Robert E. Corb
ATTORNEYS

United States Patent Office 3,218,114
Patented Nov. 16, 1965

3,218,114
CINEMATOGRAPHIC METHOD AND APPARATUS
David S. Grey, Lexington, Mass., assignor to Polaroid Corporation, Cambridge, Mass., a corporation of Delaware
Filed May 19, 1961, Ser. No. 111,334
32 Claims. (Cl. 352—44)

This invention relates to cinematography and, more particularly, to novel and improved methods and apparatus for producing and exhibiting motion pictures.

In British patent specification 421,120, dated December 10, 1934 and in U.S. Patent No. 2,950,644, issued August 30, 1960 in the name of Edwin H. Land et al., there is described a method of cinematography in which the image of a scene produced by an objective lens is dissected by a lenticular screen into a multiplicity of minute images each located in the field of a lenticule and representing an image of an aperture associated with the lens. The lens aperture is moved in relation to the lenticular screen and a photographic recording medium associated therewith in such a manner as to cause the image of the aperture, formed by each lenticule on the photographic recording medium, to be displaced progressively in the field of each lenticule. Advantages of this system of cinematography reside in the fact that it lends itself readily to additive color reproduction, e.g., by the use of appropriate filters in the lens aperture; and the relative movement between the lens aperture and the lenticular screen and recording medium is continuous rather than intermittent thereby making the method suitable for high speed cinematography. While this method offers the advantages attendant with continuous, rather than intermittent, movement of the components of the systems for taking and exhibiting the pictures, the utility of the method may be restricted due to the fact that the field of each lenticule is of a finite area, thus limiting the number of successive composite images or "frames" which can be formed on an area of the photographic recording medium. Accordingly, when an area of the photographic recording medium has been completely exposed and the sequence of composite images is to be continued, another area of photographic recording medium must then be moved into position for exposure, in much the same manner as in more conventional cinematographic practice.

Objects of the invention are: to provide a method of cinematography in which a lenticular screen is employed to produce successive composite images each comprising a multiplicity of minute images each representing aspects of an exposure aperture and of the scene being depicted, and the movements of the components of the system for performing the method are substantially continuous throughout the production of a succession of composite images; and to provide a method of cinematography as described wherein the number of composite images which can be produced in succession continuously and without interruption is limited only by the length of the photographic recording medium available.

When producing motion pictures by a method of the type described, in order to minimize the problems associated with registration of the images and lenticules during exhibition, and then to achieve best results, e.g., high resolution, good pictorial quality, accuracy of reproduction, etc., each point in the record plane, corresponding to a point in the scene, should be bounded only by other points which correspond to neighboring points in the scene. Accordingly, the invention has as another object the provision of a method of cinematography as described for producing a succession of composite photographic images in a record plane in which every image point has, as neighbors, only points which correspond to neighboring points in the scene being depicted.

Other objects of the invention are: to provide a method of cinematography as described wherein the image of the scene is formed by an anamorphotic optical system which magnifies the image to a greater degree in the first of two mutually perpendicular directions, and the lenticular screen comprises cylindrical lens elements which are arranged with their axes extending in the second of the mutually perpendicular directions; to provide a method as described in which the photographic recording medium is moved continuously at substantially uniform velocity along a linear path relative to the optical system during formation of a sequence of composite images of the scene, and the image of the scene formed by the optical system is moved so as to prevent relative motion of the last-mentioned image and the recording medium in the second of the mutually perpendicular directions; to provide a method as described wherein the lens elements of said lenticular screen form line images each representing aspects of an aperture associated with the optical system and aspects of the scene being depicted, and the movement of the recording medium relative to the aperture is such as to cause relative movement of the line images and recording medium in the first of the mutually perpendicular directions; and to provide a method as described wherein said optical system is astigmatic having two image surfaces, said lenticular screen is located substantially at one of said image surfaces and said recording medium is located substantially at the other of said image surfaces.

Further objects of the invention are: to provide a novel and improved cinematographic apparatus for producing and exhibiting motion pictures according to the method described; and to provide in cinematographic apparatus of the type described, an anamorphotic image-forming optical system having different degrees of magnification in mutually perpendicular directions, the system being astigmatic and having two image planes in each of which is formed one of two mutually perpendicular aspects of the scene being depicted, the mutually perpendicular aspects of the scene being disposed in said mutually perpendicular directions.

Other objects of the invention will in part be obvious and will in part appear hereinafter.

The invention accordingly comprises the process involving the several steps and the relation and order of one or more of such steps with respect to each of the others and the apparatus processing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1A:
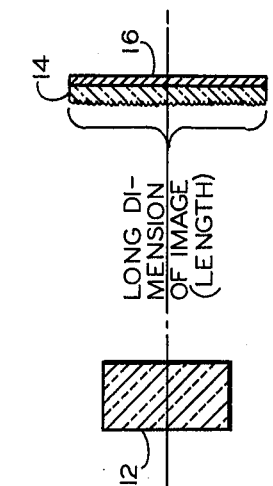
FIGURES 1a and 1b are schematic sectional views of a photographic system for practicing the invention, the views being taken substantially along the optic axis of the system in planes perpendicular to one another.
Figure 1B:
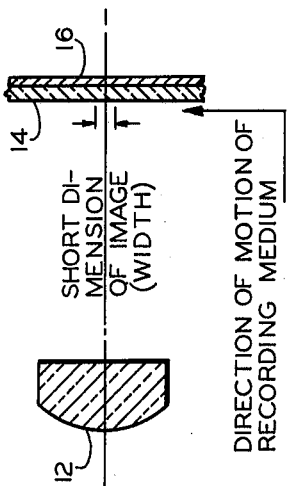

Reference is now made to FIGS. 1a and 1b of the drawing wherein there is illustrated diagrammatically the essential components of apparatus such as a camera for practicing the method of the invention; and the manner in which the components of the apparatus are employed in conjunction with a photographic recording medium for producing motion pictures. The apparatus includes an anamorphotic image-forming optical system constructed according to known principles and illustrated as a pair of cylindrical lenses. These cylindrical lenses, designated 10 and 12, are positioned along the optic axis of the system with their axes of principal curvature substantially perpendicular to one another and to the optic axis. In a preferred form of the invention the image-forming optical system is characterized by what may be termed an "extreme" anamorphotic ratio as compared to conventional anamorphotic objective lens systems; and is capable, for example, of producing a real image with a ratio of long to short dimensions of about ten to one. In this method the long dimension of the image would take up substantially the full width of the photographic recording medium. It should be understood that the anamorphotic objective lens system is shown as comprising a pair of cylindrical lenses only for the purposes of illustration, and that the use of other forms of objective lens systems capable of forming a real image having a greater degree of magnification in one of two perpendicular directions is considered to be within the scope of the invention.

A lenticular screen 14 comprising a multiplicity of minute cylindrical lens elements termed "lenticules" is positioned near an image plane of the anamorphotic lens with the cylindrical axes of the lenticules extending substantially parallel with one another and with the short dimension of the image, and perpendicular to the long dimension of the image. The lenticular screen is of a conventional type with each cylindrical lenticule being of a width which may approach a submacroscopic so that the lenticules, when viewed in aggregate, cannot be distinguished individually. It may be desirable to have the smallest (diameter or width) lenticules possible in order to achieve the largest number of resolution elements per unit area of the composite image. Lenticular screen 14 is of an area such that it completely occupies the image plane of the anamorphotic image-forming system and may comprise a component separate and distinct from the photographic recording medium; or in an alternative embodiment, the photographic recording medium, designated 16, may comprise an integral part of the lenticular screen.

Photographic recording medium 16 preferably takes the form of a layer of any of the conventional light-sensitive materials usually employed in picture-taking processes, such as the gelatino silver halide emulsions, carried on a suitable support sheet which, in one form, may comprise the lenticular screen. Whatever the nature of its support, the photographic recording medium is positioned for exposure with a surface (to be exposed) located at the focal surface of the lenticular screen so that an image of an aperture associated with the objective lens will be produced by each lenticule on the surface of the recording medium. The image of the scene (to be depicted) is thus produced on the recording medium as a composite image made up of a plurality of minute images representing aspects of the aperture, each minute image being formed by and located behind one of the lenticules in the field thereof and occupying only a portion of the area of the field of the lenticule.

In a preferred form the objective lens, in addition to displaying anamorphism, is designed to display astigmatism specifically by producing images at two surfaces termed "image surfaces." The images formed by the objective lens represent two mutually perpendicular aspects of the scene being depicted, these aspects being disposed in the same directions as the long and short dimensions (or unequal magnification) of the image produced by the lens. By the expression, mutually perpendicular aspects" is meant that the image produced by the lens at one image surface is formed by light rays contained in planes extending in one direction, for example, parallel with the short dimension of the image (and the long dimension of the exposure aperture); and the other image is formed by rays contained in planes perpendicular to the first-mentioned planes, parallel with the long dimension of the image and perpendicular to the axes of the lenticules. The lenticular screen in this embodiment is located at the image surface of the lens at which the image represents those aspects of the scene which are disposed in a direction parallel with the axes of the lenticules. Each lenticule thus produces an image on the recording medium representing an aspect of the exposure aperture. The recording medium is positioned at the other image surface of the objective lens so that each line image formed behind a lenticule also represents those aspects of the scene which are disposed parallel to the axes of the lenticules and are imaged directly on the recording medium by the objective lens. Each line image formed behind a lenticule on the recording medium represents a composite of an image of the lens objective in a direction parallel with the lenticule axis and an image of the scene perpendicular to the lenticule axis.

As the recording medium is being exposed for producing a sequence of composite images of a scene, the recording medium is moved relative to the image-forming optical system in the direction of the lenticules, that is, transversely of the long dimension of the image. In this manner, successive exposure areas or frames of the recording medium are presented for exposure, the expressions "exposure area" and "frame" being used herein to denote an area of the recording meduim corresponding to and substantially coextensive with the real image of the scene produced by the anamorphotic image-forming optical system. Movement of the recording medium during exposure thereof is along a linear path, is uninterrupted and is at a substantially uniform rate so that such movement can be effected by the simplest of film-advancing mechanisms of a type well known in the art. As previously noted, the recording medium may comprise a portion of the lenticular screen in which case the screen itself is moved relative to the objective lens; and in the alternative embodiment, the lenticular screen and recording medium are separable from one another with the screen comprising an initially fixed component of the apparatus and the recording medium being moved relative to both the screen and the objective lens. The first-mentioned embodiment offers the advantages of easily maintained registration betwen the image to be exhibited and the screen which is employed during both image formation and exhibition; whereas the latter system offers the advantage of inexpensiveness with regard to the cost of the film employed, since such film need not embody a lenticular screen because the latter would be a permanet, reusable component of the apparatus.

The aperture which is associated with the image-forming optical system and is imaged by the lenticules is preferably in the form of a narrow slot or slit designated 18, formed in an obturating element 20 located at cylindrical lens 10. Aperture 18 extends in a direction substantially parallel with the axes of the lenticules so that each lenticule forms a line image of the slit on an area of the surface of the recording medium underlying each lenticule. In the embodiment of the process illustrated in FIGS. 1a and 1b, a sequence of composite images is formed in the recording medium by moving aperture 18, in a direction perpendicular to its length and to the axes of the lenticules, relative to the lenticular screen and recording medium so that each line image of the aperture, formed by a lenticule, is displaced behind that lenticule on the area of the surface of the recording medium lying in the field of the lenticule. In this manner, as aperture 18 is moved from one side to the other of cylindircal lens 10, the area of the recording medium lying in the field of each lenticule is scanned by a line image of aperture 18 forming a succession of composite images of the scene in an elongated exposure area of the recording medium.

During formation of a sequence of composite images in a frame of recording medium 16, the latter is moved with respect to the image-forming optical system and hence the image formed thereby. Accordingly, means are provided, shown in the form of a variable prism 22, for displacing the image formed by the anamorphotic objective lens in the direction of movement of the recording medium and at the same linear rate as the recording medium so that there is no relative movement between the recording medium and the image produced thereon. It is also by virtue of this arrangement that the sequence of composite images formed in a single exposure area or frame of the recording medium achieves the optimum condition, i.e., every image point has as a neighbor only image points which correspond to neighboring points in the scene being depicted.

The number of successive composite images which can be produced in any exposure area or frame of the photographic recording medium is, of course, limited. Thus, if a sequence of composite images is not to be limited to one exposure frame, then provision must be made for producing additional sequences of composite images, without interruption, in successive frames of the recording medium. This, as noted in the objects set forth heretofore, is to be accomplished with a system in which the components are moved continuously and without interruption. To this end, the obturating element 20 may be provided with a plurality of apertures 18 arranged to be moved in succession across cylindrical lens 10 and spaced from one another so that each aperture moves into position to transmit light for exposing the recording medium as the previous aperture moves out of position to perform this function. The movement of the apertures is synchronized with the movement of the recording medium so that a new aperture comes into position to transmit light for exposing the recording medium as each new exposure frame of the recording medium is moved into position for exposure. The rate of linear movement of the recording medium is such that the recording medium is moved a distance equal to the short dimension of the image (short dimension of exposure frame) during the production of a sequence of composite images occupying substantially the entire exposure frame, and the time required for movement of the recording medium through this distance is equal to the period during which light is transmitted through one of apertures 18 for exposing the recording medium.

The displacement of the image formed by the objective lens system must be repeated during the exposure of each frame of the recording medium and this is accomplished by providing a variable prism comprising a fixed element and a plurality of movable elements which are moved in succession into conjunction with the fixed element in synchronism with the movement of successive apertures into position for transmitting light for exposing the recording medium. The constructions of mechancial expedients for moving successive apertures and successive prism elements in the manner described are considered to be well within the skill of the art and for this reason are not shown and described.

In the mehod set forth above, as the recording medium is moved continuously and at constant speed, a succession of exposure areas or frames are exposed to produce, in each frame, a succession of composite images of the scene being depicted. The first composite image formed in each frame is formed without pause immediately following formation of the last composite image in the previous frame and there need be no separation between adjacent frames. Because the movement of the recording medium is linear and nonintermittent, the means for effecting its movement is not required to be as complex as would be the case if its movement were intermittent. Moreover, the apparatus requires no shutter or, at most, the simplest of shutters which opens at the commencement of the formation of a sequence of images and closes when exposure is to be terminated. If no shutter is provided, then exposure of the recording medium piror and subsequent to formation of an image sequence and constituting waste recording medium is limited to a maximum of two composite images, the equivalent of two frames in conventional motion picture practice. There is no necessity for a shutter which opens and closes for each successive image, together with means synchronizing the shutter function with the movement of the recording medium.

Figure 2:
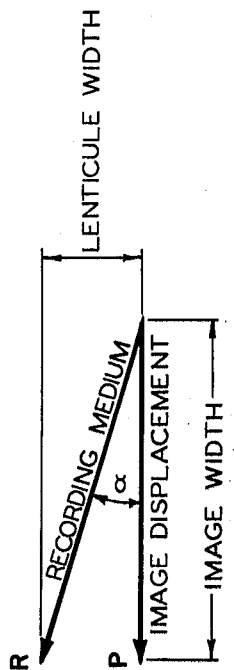
FIG. 2 is a vector diagram illustrating the method of the invention.

Reference is now made to FIG. 2 of the drawing wherein there is shown a vector diagram illustrating another embodiment of the invention, particularly the image displacement and relative movements of the recording medium and the components of the apparatus for performing the method. In this embodiment the recording medium is separate from the lenticular screen and its motion is shown by a vector designated R. The lenticular screen and aperture remain fixed and the only other movement, in addition to that of the recording medium, is that of the means for moving the image according to vector P so that the image remains "stationary" with respect to the recording medium.

The recording medium in this embodiment is moved along a linear path at an angle $\alpha$ with respect to the axis of the lenticules in such a way that during movement of any point on the recording medium through a distance, measured along a lenticule, equal to the short dimension of the image, the same point is translated through a distance, measured perpendicularly to the lenticules, equal to the width of a lenticule. This angle ($\alpha$) is the angle the tangent of which is equal to the lenticule width divided by the image width, is quite small, and, in most cases, may be less than 1 degree. For example, with a lenticule width of .006 inch and an image width of ½ inch, the angle ($\alpha$) would be approximately 40 seconds. The movement of the recording medium in this manner has the effect of displacing each line image formed by a lenticule relative to the recording medium across an area thereof coextensive with the field of the lenticule, and is the same as that obtained by moving the aperture across the image-forming optical system as described hereinbefore.

Figure 3:
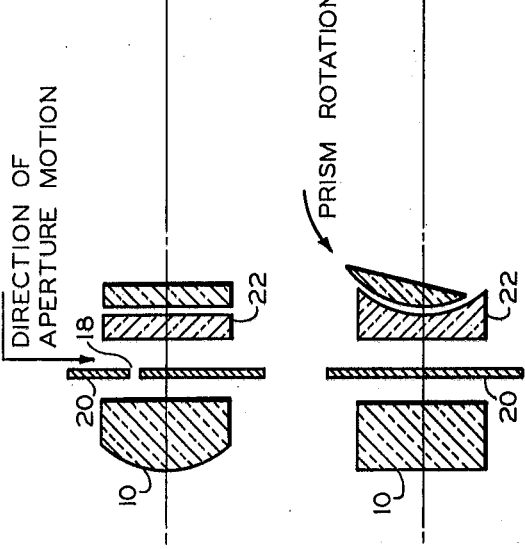
FIG. 3 is a schematic view of components of a photographic system for practicing the invention.

Another, and in some respects, simpler form of light-deviating means may be employed in this last-mentioned method for moving the image so that it remains substantially stationary with respect to the photographic recording medium. This light-deviating means may take the form of a pair of contrarotating disks 24 each made up of a plurality of sector-shaped wedge prisms 26. The two disks are mounted so that two prisms overlap at the optic axis of the image-forming optical system and function to displace the image formed by the system. Rotation of the disks is such that the image is displaced immediately as each successive pair of prisms comes into alignment or intersection for transmitting light through the objective lens to the recording medium, and this occurs at the instant each successive frame of the recording medium is moved into position for exposure. Disks 24 comprising the sector-shaped wedge prisms 26 are illustrated in FIG. 3 together with a slit-type exposure aperture 28 to show the relative positions of the disks, wedge prisms and exposure aperture, and the rotation of the disks.

In another system for producing motion pictures according to the method of the invention, a single moving element may be employed both to move the aperture and to move the image so that it remains stationary with respect to the recording medium. The construction of the anamorphotic image-forming optical system and the motion of the recording medium with respect to the anamorphotic system are basically the same as shown in FIGS. 1a and 1b, and the "aperture" of the system which is imaged by the lenticules comprises a narrow, elongated plane mirror for reflecting light transmitted through the optical system. The mirror is mounted for movement with respect to the optical system for the purpose of causing each image of the mirror, formed by a lenticule on the surface of the recording medium, to be displaced behind that lenticule in the field thereof. Displacement of the scene image so that it remains stationary with respect to the recording medium is also effected by movement of the mirror.

In another embodiment of the anamorphotic image-forming optical system, the slit-type aperture comprises a light-refracting component of the system and is moved with respect to the other components of the optical system and the recording medium. Since anamorphotic optical systems basically comprise two optical surfaces having axes of principal curvature which lie in perpendicular planes, a slit (aperture), which has many of the optical properties of the aperture of a pinhole camera and of a cylindrical lens in an anamorphotic system, may be substituted in place of one or both of the two optical surfaces. The slit and the axis of principal curvature of the optical surface in one embodiment, or the two slits in another embodiment, are required to be at least skew perpendicular and substantially parallel with the image plane of the system.

In a preferred embodiment, cylindrical lens 10 of FIGS. 1a and 1b is replaced by a slit aperture which may be substantially the same as aperture 18 and which performs the function of aperture 18. The width of the slit is determined according to the same considerations applied to determining the size of a pinhole lens for a camera. In this connection, some of the factors taken into consideration include the image size of a point source at infinity, which should be as small as possible in order to achieve the best resolution; and the avoidance of diffraction, which is dependent on the wave length of light used to form the image (considered for practical purposes to be one-half micron). With these considerations in view, the following equation is derived according to well-known optical principles for the diameter, D, of a pinhole at a distance, $f$, measured in millimeters, from the, "focal plane" of a pinhole camera:

$$D = \frac{\sqrt{f}}{30}$$

In a simple anamorphotic lens system, i.e., two perpendicular cylinders, the anamorphotic ratio is the ratio between the focal lengths of the two cylinders each spaced at its respective focal length from the image surface of the system, and the same consideration applies to the focal length and position of a slit aperture substituted for a cylindrical lens. In an embodiment of the system employing a slit as a light-refracting component, the image-deviating means may comprise a mirror which is pivoted about an axis located at its reflecting surface and disposed parallel with the focal surface of the anamorphotic system and perpendicular to the lenticules.

The composite images formed in the recording medium by exposure thereof and subsequent processing (of a conventional type) can be exhibited to reproduce the scene depicted by a method which is substantially the reverse of the method employed to produce the images. This is accomplished by registering with the composite images a lenticular screen identical to that employed in image production, in the same relative position as during exposure, providing a source of illumination behind the images, and imparting to the image-carrying medium and the components of the system the same relative movements as were imparted to the recording medium and components of the system during exposure. In fact, it is possible to employ essentially the same apparatus for both picture taking and exhibition of the motion pictures.

Since certain changes may be made in the above process and apparatus without departing from the scope of the invention herein involved, it is intended that all matter contained in the above description or shown in the accompanying drawing shall be interpreted as illustrative and not in a limiting sense.

What is claimed is:

1. A method of cinematography which comprises directing light through an anamorphotic image-forming optical system having a greater degree of magnification in a first of two mutually perpendicular directions; positioning a lenticular screen having a multiplicity of minute cylindrical lens elements near an image surface of said optical system with the axes of curvature of said lens elements extending in the second of said mutually perpendicular directions; interposing an aperture in the path of light transmitted by said optical system and said screen; producing a line image representing aspects of said aperture and the scene being depicted behind each of said lens elements on the surface of a photographic recording medium positioned at the image plane of said lens elements; continuously moving said recording medium and said optical system relative to one another in said second direction while simultaneously so moving said aperture and said recording medium continuously relative to one another as to move said line images relative to said surface of said recording medium in said first direction; and displacing the image formed by said optical system relative thereto in the same direction as said recording medium is moved relative to said optical system to prevent motion of the last-mentioned image in said second direction relative to said recording medium.

2. The method of claim 1 wherein said recording medium and said lenticular screen are held stationary with respect to one another and are moved together in said second direction relative to said aperture.

3. The method of claim 1 wherein said photographic recording medium is moved in said second direction relative to said screen.

4. The method of claim 1 wherein said aperture and said screen are held stationary with respect to one another and said optical system, and said photographic recording medium is moved relative to said optical system, said aperture and said screen.

5. The method of claim 4 wherein said photographic recording medium is moved linearly at substantially constant velocity.

6. The method of claim 1 wherein said aperture comprises a slit extending in said second direction and moved in said first direction.

7. The method of claim 1 wherein a sequence of line images is formed underlying each of said lens elements comprising an elongated section of said lenticular screen generally coextensive with said last-mentioned image formed by said optical system during movement of said line images through a predetermined distance relative to said recording medium on an area thereof underlying said section of said screen; and a second, continuing sequence of said line images is formed by repeating both the movement of said recording medium relative to said optical system and said line images and the displacement of said last-mentioned image while continuing, without interruption, to move said recording medium linearly at constant velocity relative to said optical system.

8. The method of claim 7 wherein a plurality of said apertures is moved in succession relative to said recording medium in said first direction across the path of light transmitted by said optical system, each of said apertures being moved across said path to form one of said sequences of line images; and said aperatures are moved continuously and at substantially constant speed to repeat the movement of said line images in said second direction relative to said recording medium and thereby form a succession of sequences of said line images.

9. The method of claim 8 wherein said last-mentioned image is displaced by a light-deviating device disposed in said path of light transmitted by said optical system and said aperture and including at least a component which is moved continuously and at substantially constant speed for effecting the repetitive displacement of said last-mentioned image in synchronism with the repetitive movement of said aperture.

10. The method of claim 9 wherein the means providing said aperture and said light-deviating device comprise a light-reflecting element which is moved relative to said optical system and said recording medium.

11. The method of claim 1 wherein said aperture comprises a light-refracting component of said image-forming optical system, said aperture is elongated and is disposed with its long dimension extending in said second direction, and said light-refracting component is moved in said first direction relative to said recording medium.

12. The method of claim 1 wherein said anamorphotic image-forming optical system is astigmatic having two image surfaces, said lenticular screen is positioned at one of said image surfaces, and said photographic recording medium is positioned at the other of said image surfaces.

13. A method of cinematography which comprises directing light from a scene through an anamorphotic image-forming optical system having a greater degree of magnification in a first of two mutually perpendicular directions to and through a lenticular screen positioned near an image surface of said optical system and comprising a multiplicity of minute cylindrical lens elements arranged with their axes extending in the second of said mutually perpendicular directions; transmitting said light through an elongated aperature comprising said optical system; producing, with each of said lens elements, a sequence of line images representing aspects of said aperture and aspects of said scene behind each of said lens elements on the surface of a photographic recording medium positioned for exposure at the image surface of said lens elements, said sequences of line images being produced by so moving said aperture and said recording medium relative to one another as to move said line images relative to said surface of said recording medium in said first direction; during exposure of said recording medium, moving said recording medium and said optical system continuously relative to one another in said second direction; and displacing the image formed by said optical system relative thereto in the same direction as said recording medium is moved relative to said optical system to prevent motion of the last-mentioned image in said second direction relative to said recording medium.

14. A method of cinematography which comprises directing light from a scene through an anamorphotic image-forming optical system having a greater degree of magnification in a first of two mutually perpendicular directions to and through a lenticular screen positioned near an image surface of said optical system to form an image of said scene, said lenticular screen comprising a multiplicity of minute cylindrical lens elements arranged with their axes extending in a second of said mutually perpendicular directions; transmitting said light through a narrow, elongated aperture comprising said optical system; producing a line image representing aspects of said aperture and aspects of said scene behind each of said lens elements on the surface of a photographic recording medium positioned for exposure at the image plane of said lens elements, to form a composite image of said scene on said surface; producing a sequence of said composite images by so moving said aperture and said recording medium relative to one another as to move said line images relative to said surface of said recording medium in said first direction; and during exposure of said recording medium to form said sequence of composite images, moving said recording medium and said optical system continuously relative to one another in said second direction, and displacing the image formed by said optical system relative thereto in the same direction as said recording medium is moved relative to said optical system to prevent motion of the last-mentioned image in said second direction relative to said recording medium.

15. The method of claim 14 wherein said sequence of composite images of said scene is formed behind the lens elements comprising an elongated section of said lenticular screen generally coextensive with said last-mentioned image on an area of said surface of said recording medium underlying said section of said screen; and during formation of said sequence of composite images, said recording medium is moved in said second direction relative to said optical system through a distance approximately equal to the shorter dimension of said image of said scene and said line images are moved in said first direction relative to said recording medium through a distance approximately equal to the widths of said lens elements.

16. The method of claim 15 wherein at least another continuing sequence of composite images of said scene is formed on an area of said surface of said recording medium adjacent the last-mentioned area of said surface by continuing the relative motion of said recording medium and optical system in said second direction, and by repeating the relative motion of said line images and said recording medium in said first direction and said displacement of said last-mentioned image relative to said optical system, said relative motion of said recording medium and said optical system in said second direction is continued without interruption during the formation of sequential composite images.

17. The method of claim 16 wherein a plurality of apertures is moved continuously with respect to said recording medium in sequence into position to transmit light for exposing said recording medium during formation of sequential composite images, a different one of said apertures transmitting light during formation of each of said sequences of composite images.

18. The method of claim 15 wherein said last-mentioned image is displaced by a light-deviating device including a component which is moved continuously and at substantially constant speed during the formation of sequential composite images, and wherein said light-deviating device and the means providing said aperture comprise a light-reflecting element which is moved relative to said optical system and said recording medium.

19. The method of claim 14 wherein said aperture comprises a light-refracting component of said image-forming optical system, said aperture is elongated and is disposed during exposure of said recording medium with its long dimension extending in said second direction, and said light-refracting component is moved in said first direction relative to said recording medium during exposure thereof by light transmitted through said aperture.

20. The method of claim 14 wherein said lenticular screen and said recording medium are fixedly associated with one another and are moved together in said second direction relative to said aperture.

21. The method of claim 14 wherein said photographic recording medium is moved in said second direction relative to said screen.

22. The method of claim 14 wherein said aperture and said screen are held stationary with respect to one another and said optical system; and said photographic recording medium is moved relative to said optical system, said aperture and said screen.

23. The method of claim 14 wherein said anamorphotic image-forming optical system is astigmatic having two image surfaces, said lenticular screen is positioned at one of said image surfaces, and said photographic recording medium is positioned at the other of said image surfaces.

24. Photographic apparatus for producing a cinematographic sequence of composite images, said apparatus comprising, in combination, an anamorphotic image-forming optical system having a greater degree of magnification in the first of two mutually perpendicular directions; a lenticular comprising a multiplicity of minute cylindrical lens elements, said screen being positioned near an image surface of said optical system with the axes of curvature of said cylindrical lens elements extending in the second of said mutually perpendicular directions; obturator means defining a slit-like aperture associated with said optical system for transmitting light through said optical system, said aperture being positioned with its long dimension extending in said second direction; means for so moving a photosensitive recording medium relative to said optical system continuously and at a substantially uniform rate at the image surface of said lenticular screen as to effect a relative movement between said recording medium and said optical system in said second direction; means for so moving one of said obturator means and said recording medium continuously and at a substantially uniform rate as to impart a relative movement in said first direction to said recording medium and line images representing aspects of said aperture formed on said recording medium by said lenticular screen; light-deviating means associated with said optical system; and means for moving said light-deviating means continuously and at a substantially uniform rate for displacing the image formed by said optical system at said image surface in the same direction and at the same rate as the relative movement between said recording medium and said optical system.

25. The photographic apparatus of claim 24 wherein said lenticular screen is fixed with respect to said optical system, and said means for moving said recording medium moves the latter relative to said screen in said second direction.

26. The photographic apparatus of claim 24 wherein said aperture and said screen are substantially fixed with respect to said optical system; and said means for moving said recording medium moves the latter relative to said screen, aperture and optical system along a linear path located at an angle to said second direction, the sine of said angle being equal to the width of one of said lens elements divided by the short dimension of said image formed by said optical system.

27. The photographic apparatus of claim 24 wherein said obturator means comprises a plurality of slit-like apertures movable in succession into position for transmitting light through said optical system, and means are provided for coordinating the relative movements of said apertures and said recording medium to position each of said apertures for producing a succession of segmented images in one of a succession of areas of said image-recording medium.

28. The photographic apparatus of claim 27 wherein said light-deviating means comprises a plurality of individual light-deviating devices each movable into position for displacing said image, and said means for moving said light-deviating means comprises means for moving said devices in succession into said position in synchronism with the movement of successive apertures into position for transmitting light.

29. The photographic apparatus of claim 24 wherein said slit-like aperture comprises a light-refracting component of said image-forming optical system.

30. The photographic apparatus of claim 24 wherein said slit-like aperture is defined by a light-reflecting element which is movable with respect to said optical system for effecting said relative movement between said recording medium and said line images of said aperture and displacing said image formed by said optical system.

31. The photographic apparatus of claim 24 wherein said image-forming optical system is astigmatic and includes two image surfaces at which said system forms images representing two mutually perpendicular aspects of the scene being imaged by said lens, said aspects being disposed in said mutually perpendicular directions.

32. The apparatus of claim 31 wherein said screen is positioned at the image surface of said optical system at which said system forms an image of aspects of said scene extending in said second direction, and means are provided for positioning said photosensitive recording medium at the other of said image surfaces of said optical system.

References Cited by the Examiner

UNITED STATES PATENTS

| | | | |
|---|---|---|---|
| 357,746 | 2/1887 | Vansant | 95—64 |
| 1,482,503 | 2/1924 | Ames | 88—57 |
| 2,832,262 | 4/1958 | Cook | 88—57 |
| 2,890,622 | 6/1959 | Wallin | 88—57 |
| 2,950,644 | 8/1960 | Land et al. | 352—44 |

FOREIGN PATENTS

| | | |
|---|---|---|
| 323,089 | 7/1902 | France. |
| 705,281 | 4/1941 | Germany. |
| 421,120 | 12/1934 | Great Britain. |
| 861,990 | 3/1961 | Great Britain. |

OTHER REFERENCES

Courtney-Pratt: "Fast Multiple Frame Photography," Journal of Photographic Science, vol. 1, No. 1, pages 21–40, January 1953, copy in Patent Office Library.

NORTON ANSHER, *Primary Examiner.*

WILLIAM MISIEK, *Examiner.*